US012259986B2

(12) United States Patent
Aslani et al.

(10) Patent No.: US 12,259,986 B2
(45) Date of Patent: Mar. 25, 2025

(54) DETECTION AND MITIGATION OF HIGH-RISK ONLINE ACTIVITY IN A COMPUTING PLATFORM

(71) Applicant: QlikTech International AB, Lund (SE)

(72) Inventors: Mina Aslani, Ottawa (CA); José Francisco Díaz López, Lund (SE)

(73) Assignee: QlikTech International AB, Lund (SE)

( * ) Notice: Subject to any disclaimer, the term of this patent is extended or adjusted under 35 U.S.C. 154(b) by 358 days.

(21) Appl. No.: 17/695,715

(22) Filed: Mar. 15, 2022

(65) Prior Publication Data

US 2023/0297706 A1  Sep. 21, 2023

(51) Int. Cl.
*G06F 21/62*   (2013.01)
*H04L 9/40*    (2022.01)

(52) U.S. Cl.
CPC ...... *G06F 21/6218* (2013.01); *H04L 63/0236* (2013.01); *H04L 63/1416* (2013.01); *G06F 2221/2103* (2013.01)

(58) Field of Classification Search
CPC ......... G06F 21/6218; G06F 2221/2103; H04L 63/0236; H04L 63/1416; H04L 63/083; G06N 3/006; G06N 3/08; G06N 3/126; G06N 5/046; G06N 7/01; G06N 7/02
See application file for complete search history.

(56) References Cited

U.S. PATENT DOCUMENTS

| | | | |
|---|---|---|---|
| 2006/0130147 A1* | 6/2006 | Von-Maszewski | ........................ H04L 63/1408 726/13 |
| 2018/0033089 A1* | 2/2018 | Goldman | ............... H04L 63/102 |
| 2018/0103044 A1* | 4/2018 | Malinowski | ............. G06N 3/02 |
| 2020/0410096 A1* | 12/2020 | Zagorsky | .............. G06F 21/566 |
| 2021/0064748 A1* | 3/2021 | Gordeychik | .......... G06F 21/566 |
| 2021/0336940 A1* | 10/2021 | Aslaksen | ................ H04L 63/08 |

OTHER PUBLICATIONS

International Search Report and Written Opinion issued in related application No. PCT/IB2023/000152 mailed Aug. 25, 2023.

* cited by examiner

*Primary Examiner* — Han Yang
(74) *Attorney, Agent, or Firm* — Ballard Spahr LLP

(57) ABSTRACT

Technologies are provided for detection and mitigation of high-risk online activity. The detection and mitigation can be implemented in real-time. In some embodiments, a computing system can determine that a risk assessment for an online activity is unavailable from an in-memory storage. The computing system can obtain the risk assessment for the online activity from a second computing system configured to apply a prediction model to data defining the online activity. The risk assessment can comprise a risk score and a risk category. The computing system can update the in-memory storage to incorporate the data and the risk assessment, and can determine that the risk assessment is indicative of the online activity being high-risk activity. The computing system can then cause denial of access to a computing platform to a user device associated with the online activity.

20 Claims, 5 Drawing Sheets

DETECTION AND MITIGATION OF HIGH-RISK ONLINE ACTIVITY IN A COMPUTING PLATFORM

SUMMARY

It is to be understood that both the following general description and the following detailed description are illustrative and explanatory only and are not restrictive.

In one embodiment, the disclosure provides a computer-implemented method. The computer-implemented method includes determining that a risk assessment for an online activity is unavailable from an in-memory storage. The computer-implemented method also includes obtaining the risk assessment for the online activity from a computing system configured to apply a prediction model to data defining the online activity. The risk assessment can include a risk score and a risk category. The computer-implemented method further includes updating the in-memory storage to incorporate the data and the risk assessment. The computer-implemented method still further includes determining that the risk score and the risk category are indicative of the online activity being high-risk activity; and causing denial of access to a computing platform to a user device associated with the online activity upon the determining that the risk score and the risk category are indicative of the online activity being high-risk activity.

In another embodiment, the disclosure provides a computing system. The computing system includes at least one processor, and at least one memory device having processor-executable instructions stored thereon that, in response to execution by the at least one processor, cause the computing system to determine that a risk assessment for an online activity is unavailable from an in-memory storage. In response to further execution, the processor-executable instructions further cause the computing system to obtain the risk assessment for the online activity from a second computing system configured to apply a prediction model to data defining the online activity. The risk assessment can include a risk score and a risk category. In response to further execution, the processor-executable instructions further cause the computing system to update the in-memory storage to incorporate the data and the risk assessment. In response to further execution, the processor-executable instructions still further cause the computing system to determine that the risk score and the risk category are indicative of the online activity being high-risk activity; and to cause denial of access to a computing platform to a user device associated with the online activity upon determining that the risk score and the risk category are indicative of the online activity being high-risk activity.

In yet another embodiment, the disclosure provides a computer program product. The computer-program product includes at least one computer-readable non-transitory storage medium having processor-executable instructions stored thereon that, in response to execution, cause a computing system to: determine that a risk assessment for an online activity is unavailable from an in-memory storage. Further execution of the processor-executable instructions further causes the computing system to obtain the risk assessment for the online activity from a second computing system configured to apply a prediction model to data defining the online activity. The risk assessment can include a risk score and a risk category. Further execution of the processor-executable instructions further cause the computing system to update the in-memory storage to incorporate the data and the risk assessment. Still further execution of the processor-executable instructions further causes the computing system to determine that the risk score and the risk category are indicative of the online activity being high-risk activity; and to cause denial of access to a computing platform to a user device associated with the online activity upon determining that the risk score and the risk category are indicative of the online activity being high-risk activity.

Additional elements or advantages of this disclosure will be set forth in part in the description which follows, and in part will be apparent from the description, or may be learned by practice of the subject disclosure. The advantages of the subject disclosure can be attained by means of the elements and combinations particularly pointed out in the appended claims.

This summary is not intended to identify critical or essential features of the disclosure, but merely to summarize certain features and variations thereof. Other details and features will be described in the sections that follow. Further, both the foregoing general description and the following detailed description are illustrative and explanatory only and are not restrictive of the embodiments of this disclosure.

BRIEF DESCRIPTION OF THE DRAWINGS

The annexed drawings are an integral part of the disclosure and are incorporated into the subject specification. The drawings illustrate example embodiments of the disclosure and, in conjunction with the description and claims, serve to explain at least in part various principles, elements, or aspects of the disclosure. Embodiments of the disclosure are described more fully below with reference to the annexed drawings. However, various elements of the disclosure can be implemented in many different forms and should not be construed as limited to the implementations set forth herein. Like numbers refer to like elements throughout.

DETAILED DESCRIPTION

The disclosure recognizes and addresses, among other technical challenges, the issue of detection and mitigation of high-risk online activity in a computing platform. High-risk online activities in a network of computing devices can include command and control beaconing, lateral movement of assets (such as files), and denial of service attacks, amongst many other. High-risk online activities pose a threat and can cause loss of control of computing devices in the network, and also loss of digital assets. High-risk online activities typical occur over time. A form of high-risk online activity is user login that are anomalous. Embodiments of this disclosure, individually or in combination, permit detecting and mitigating high-risk online activity in real-time, as user activity data identifying the online activity becomes available. The computing platform can be a data analytics platform, for example. Although embodiments of the disclosure are described in connection with login activity, the disclosure is not limited in that respect and other types of online activity can be contemplated.

Figure 1A:
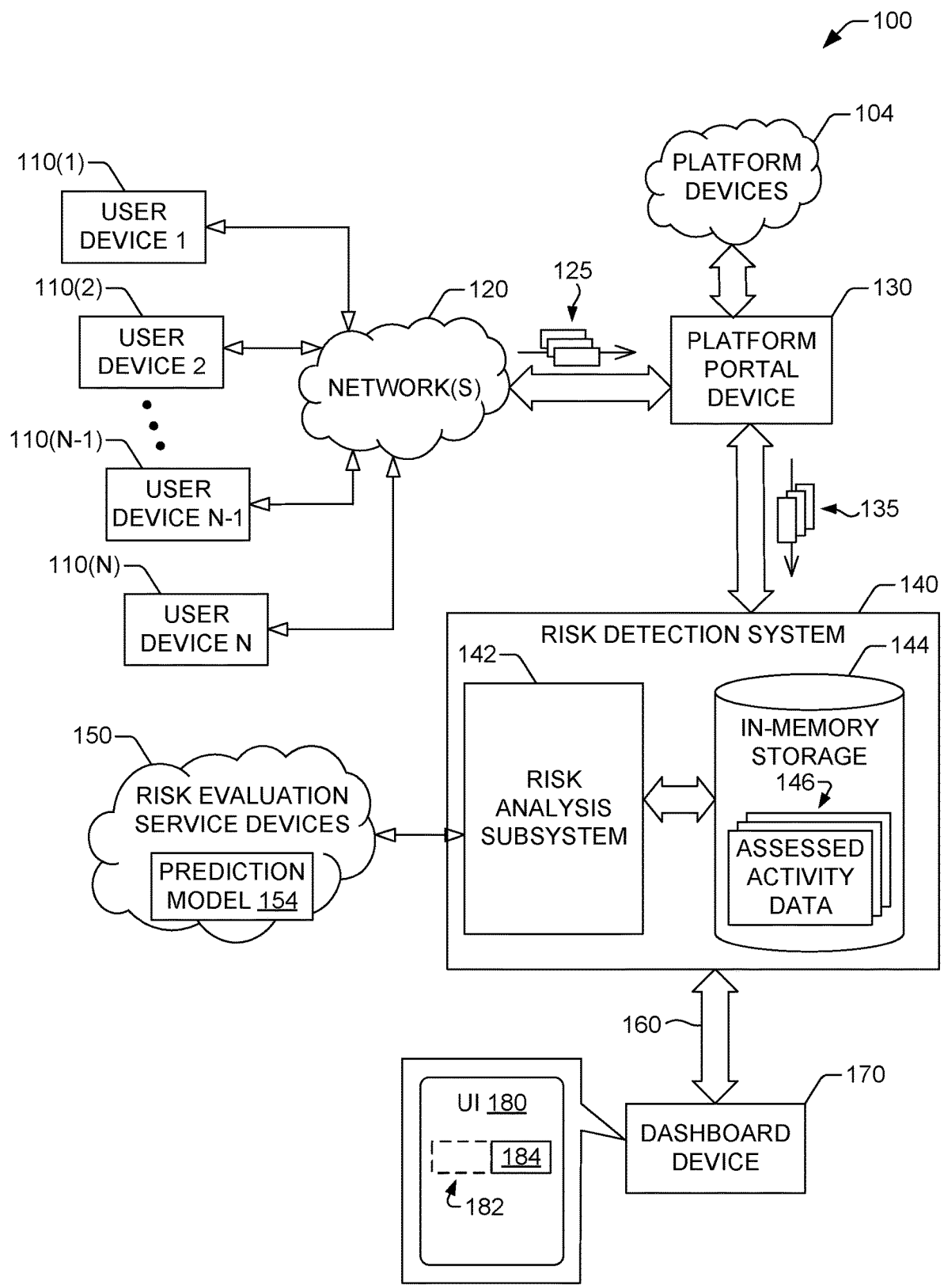
FIG. 1A illustrates an example of an operating environment for detection and mitigation of high-risk online activity in a computing platform, in accordance with one or more embodiments of this disclosure.

FIG. 1A illustrates an example of an operating environment 100 for detection and mitigation of high-risk online activity in a data analytics platform, in accordance with one or more embodiments of this disclosure. A system of multiple computing devices 104 (referred to as platform devices 104) embody the data analytics platform and provide functionality thereof. Multiple user devices can be present in the operating environment 100, including user device 1 110(1), user device 2 110(2), up to user device N−1 110(N−1), and user device N 110(N), where N is a natural number. Each one of the multiple user devices can attempt a login to a data analytics platform at various times. In some cases, the login can be legitimate in that the user device can be operated by an end-user that has a user account within the data analytics platform. In other cases the login can be fraudulent, and the user device attempting the login may be a malicious actor attempting to access the user account illicitly.

The manner of attempting a login is the same, regardless of whether a user login is legitimate or fraudulent. Specifically, to attempt a login, a user device of the multiple user devices, including user device 1 110(1) to user device N 110(N), can access a platform portal device 130 via at least one of network(s) 120. Double-headed open arrow connecting a user device to the network(s) 120 represents upstream link and downstream link and other network elements that permit communication between the user device and the network(s) 120. Such links can be wireline link(s) or wireless link(s), or a combination of both. To access the platform portal device 130, the user device can execute a client application (not depicted in FIG. 1A). In response to executing the client application, the user device can present a portal user interface (UI) associated with the data analytics platform. The platform portal device 130 can provide, to the user device, formatting information and, in some cases, media assets that can define the portal UI. The client application can be a web browser, a mobile application, or another type of software application executable in the user device. The portal UI can be a landing webpage in cases where the client application is a web browser. Regardless of its form, the portal UI can permit the user device to receive login data. The login data can define user credentials, such as username and a password. The login data constitutes an example of user activity data defining an online activity (e.g., a user login). To continue attempting the login, the user device can send the login data to the platform portal device 130 via at least one of the network(s) 120.

Each one of the multiple devices, including user device 1 110(1) to user device N 110(N), can attempt a login as is described herein. Thus, each one of the user devices can send login data to the platform portal device 130. Accordingly, the platform portal device 130 can receive login data 125 over time, where the login data 125 originates from at least one of the multiple devices. Double-headed open arrow connecting the network(s) 120 and the platform portal device 130 represents upstream link and downstream link and other network elements that permit communication between the network(s) 120 and the platform portal device 130. Such links can be wireline link(s) or wireless link(s), or a combination of both. The login data 125 can thus include one or multiple datasets containing login data for respective ones of the multiple user devices. That is, the login data 125 can include a first dataset for a first user device of the user devices 1 110(1) to N 110(N), and a second dataset for a second user device of the user devices 1 110(1) to N 110(N).

As the login data 125 becomes available, the platform portal device 130 can send login data 135 to a risk detection system 140. Double-headed open arrow connecting the platform portal device 130 and the risk detection system 140 represents upstream link and downstream link and other network elements that permit communication between the platform portal device 130 and the risk detection system 140. Such links can be wireline link(s) or wireless link(s), or a combination of both. The login data 135 can include a stream of datasets, for example. Each dataset of those datasets includes a respective instance of login data corresponding to a user device (e.g., one of user devices 1 110(1) to N 110(N)). For purposes of illustration, each instance (or, in some embodiments, at least one instance) of login data can include a username, a password, location data, a hostname, a logical address (e.g., an Internet protocol (IP) address), a timestamp, or similar. The platform portal device 130 can send each dataset of the stream of datasets in succession, as the login data 125 becomes available.

The risk detection system 140 can perform risk assessment of the received login data 135. The risk assessment can be performed in real-time, as datasets within the login data 135 become available to the risk detection system 140. The risk assessment can include a risk score or a risk category, or both, for example. The risk score can represent a probability of a user login pertaining to the risk category. Accordingly, the risk detection system 140 can include a risk analysis subsystem 142 functionally coupled to in-memory storage 144. The in-memory storage 144 can have a low latency of the order of 1 ms or less, which latency renders the in-memory storage 144 adequate for real-time access. Latencies of the order of 10 ms also may be adequate. The in-memory storage 144 thus embodies a performant cache for storage and readout of data. In one example, the in-memory storage 144 can be embodied in an in-memory key-value cache having low latency. As such, each one of the records retained in the in-memory cache can be formatted as a key-value pair, where a particular key is formed by data indicative of a particular online activity (e.g., data indicative of a particular user login) and a particular value is defined by data indicative of a corresponding risk assessment. In one example, the in-memory storage 144 is embodied in remote dictionary server (Redis).

Figure 2:
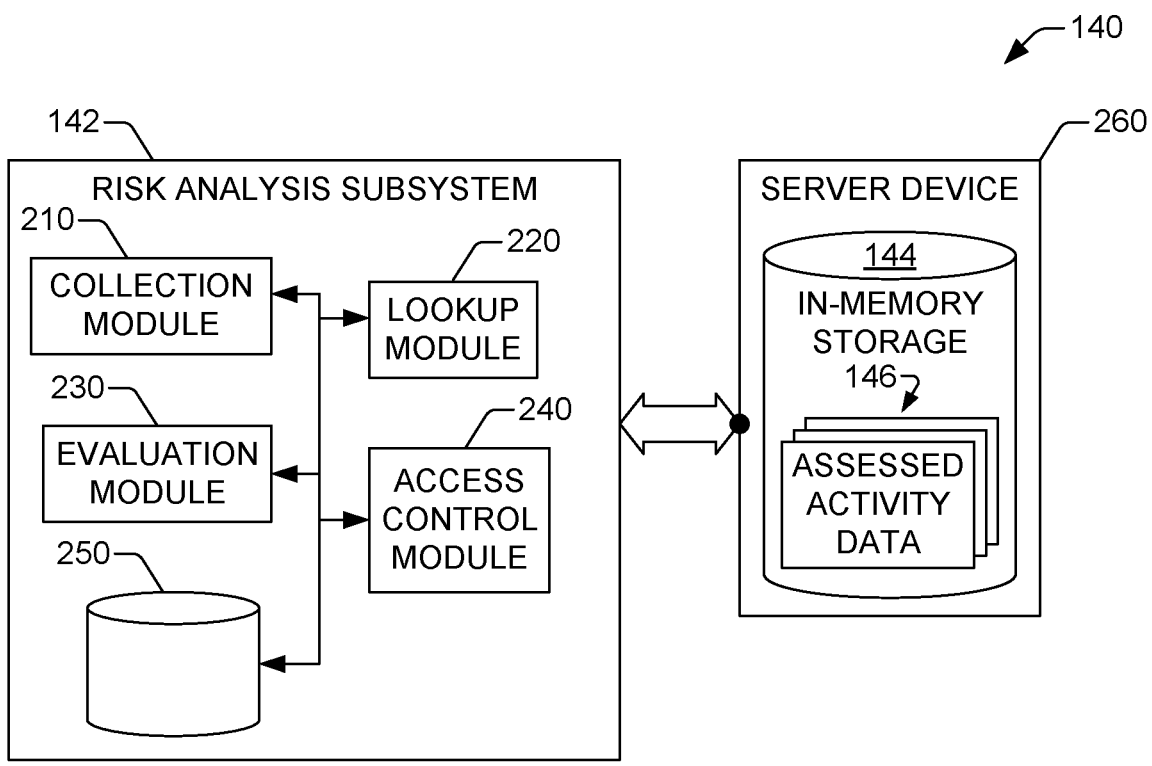
FIG. 2 illustrates an example of a computing system for detection and mitigation of high-risk online activity in computing platform, in accordance with one or more embodiments of this disclosure.

The risk analysis subsystem 142 can receive the login data 135 and can determine if risk assessments are available for respective user logins conveyed by the login data 135. In some cases, as is shown in FIG. 2, the risk analysis subsystem 142 can include a collection module 210 that receives the login data 135 and identifies user logins. For example, the collection module 210 can receive a dataset within the stream of datasets that constitute the login data 135. The collection module 210 can then parse the dataset to determine first data identifying a user login. The collection module 210 can continue receiving and parsing datasets to identify respective logins. FIG. 2 illustrates an example of the risk detection system 140 and functional elements that can be included therein.

To determine if a risk assessments are available for respective datasets within the stream of datasets that constitute the received login data 135, the risk analysis subsystem 142 can leverage the in-memory storage 144. As mentioned, each dataset includes data identifying a respective user login. The in-memory storage 144 can retain records of historical user logins and respective risk assessments. Each one of such records can include first data identifying a particular user login and second data defining a particular risk assessment. Accordingly, to determine if a risk assessment is available for a dataset, the risk analysis subsystem 142 can determine presence or absence of a record of a user login within the in-memory storage 144. That user login is defined by data included in the dataset.

To determine presence or absence of the record of the user login, the risk analysis subsystem 142 can perform a query operation against the in-memory storage 144. Performing the query operation can include generating a query including a query criterion dictating that the desired user login is the user login. Performing the query operation also can include resolving the query by accessing the in-memory storage 144. In some cases, as is shown in FIG. 2, the risk analysis subsystem 142 includes a lookup module 220 that can perform the query operation. The lookup module 220 can receive, from the collection module 210, data defining the user login and can generate the query. The lookup module 220 can resolve the query by accessing the in-memory storage 144 by means of a server-sent events (SSE) connection to the computing system. Specifically, the in-memory storage 144 can be hosted by a server device 260. The lookup module 220 can send the query to the server device 260 via the SSE connection (represented by a solid circle in FIG. 2). The server device 260 can resolve the query and can send a response message including payload data identifying a result of the query.

A null result of the query operation indicates that the record of the user login is absent from the in-memory cache 144. Hence, a risk assessment for that user login may be deemed unavailable. Therefore, the risk analysis subsystem 142 can obtain the risk assessment for the user login. To that end, the risk analysis subsystem 142 can cause a risk evaluation service to generate, using a prediction model, the risk assessment. The risk evaluation service can be implemented by a system of computing devices 150 (referred to as risk evaluation service devices 150), and can use a prediction model 154 to generate the risk assessment. The prediction model 154 can determine risk scores and risk categories for respective user logins. As mentioned, a first risk score of the risk scores defines a probability of a first user login of the respective user logins pertaining to a first risk category. In some cases, the prediction model 154 can be trained to solve a multi-task classification problem using features that characterize a user login—e.g., a dataset comprising a combination of a username, a password, location data, a hostname, a logical address (e.g., an Internet protocol (IP) address), or a timestamp can constitute appropriate features. Thus, the prediction model 154 can be trained to map those features to multiple risk categories by solving the multi-task classification problem, based on the dataset (or feature vector) characterizing the user login. To that end, the prediction model 154 can generate a label (e.g., a string of characters) identifying a risk category (e.g., "High Risk," "Moderate Risk," or "Low Risk") and also can generate, as part of solving the multi-task classification problem, a risk score for the risk category.

The disclosure is not limited to prediction models that solve a multi-task classification problem. In some cases, the prediction model 154 can be trained to solve a binary classification problem using features (e.g., a combination of a username, a password, location data, a hostname, a logical address, or a timestamp) that characterize the user login. In such cases, the prediction model 154 can be trained to map those features to two risk categories ("High Risk" and "Low Risk," for example) by solving the binary classification problem, based on the features characterizing the user login. In other cases, the prediction model 154 can be another form of supervised-learning model that is trained to assess risk level of a user login by operating on a dataset that includes features characterizing the user login. The risk level can be represented by a numeric value (a risk score, for example), a semantic value (a label or a tag, for example), or both.

More specifically, the computing risk analysis subsystem 142 can direct the risk evaluation service—or one or more of the computing devices 150 that provide the service—to generate a risk score or a risk category, or both, by applying the prediction model 154 to the dataset defining the user login. Directing the risk evaluation service to generate the risk score or risk category, or both, in such a fashion can include sending a message invoking a function call to the risk evaluation service, the message including the dataset as payload data. The risk analysis subsystem 142 can receive, from the risk evaluation service, the generated risk score and/or data identifying the generated risk category. As is shown in FIG. 2, the risk analysis subsystem 142 can include an evaluation module 230 that can obtain risk assessments for respective logins as is described herein.

The risk analysis subsystem 142, via the evaluation module 230, for example, can update the in-memory storage 144 to incorporate the user login that was absent and the corresponding risk assessment obtained from the risk evaluation service for that user login. The user login and the corresponding risk assessment can be included in the assessed activity data 146. Incorporating the user login and the risk assessment (e.g., risk score and/or risk category) into the in-memory storage 144 can include adding a key-value pair to the assessed activity data 146, for example.

For some datasets within the stream of datasets that constitute the received login data 135, the risk analysis subsystem 142 can determine that respective risk assessments are available in the in-memory storage 144, within the assessed activity data 146. In those cases, the risk analysis subsystem 142 relies on historical risk information instead of the risk evaluation service for obtaining a current risk assessment for a previously unevaluated user login.

Regardless of how a risk assessment is obtained for a current user login, the risk analysis subsystem 142 can determine if the risk assessment is indicative of the current user login being a high-risk login. To that end, in some cases, the risk analysis subsystem 142 can apply one or multiple rules to the risk assessment. The rule(s), individually or in combination, can define a condition that the risk assessment must satisfy in order to be deemed indicative of a high-risk user login. In some cases, the evaluation module 230 (FIG. 2) can apply the rule(s) to the risk assessment. Simply as an illustration, a rule can dictate that a risk score associated with a high-risk category must be equal to or greater than a threshold value (e.g., 0.85, 0.90, or 0.95) in order for the risk assessment to be deemed indicative of a high-risk user login. In other words, a confidence level that the current user login pertains to the high-risk category must meet or exceed the threshold value in order to determine that the current user login is a high-risk user login. In other cases, the risk assessment for a current login can include a single risk score and a corresponding risk category. That risk analysis subsystem 142 can determine if the risk assessment is indicative of the current user login being a high-risk login based on such a risk category. That is, in instances in which the risk evaluation service indicates that that the risk category for a current user login is a High-Risk category, the risk analysis subsystem 142 assigns that category to current user login. Conversely, in instances in which the risk evaluation service indicates that that the risk category for a current user login is a Non-High-Risk category, the risk analysis subsystem 142 assigns that category to the current user login.

In response to determining that the current user login is not a high-risk login, the risk analysis subsystem 142 can cause verification of the current user login. Verification of the current user login can result in one or multiple operations consistent with the current user login. As is shown in FIG. 2, the risk analysis subsystem 142 can include an access control module 240 that can cause the verification of the current user login. In some cases, the risk analysis subsystem 142 can cause the platform portal device 130 to verify the current user login. For example, the risk analysis subsystem 142 can send a notification (not depicted in FIG. 1A), to the platform portal device 130, that the current user login is legitimate. The notification can serve as an access control directive that causes the platform portal device 130 to grant access to the data analytics platform to a user account associated with the current user login.

In response to determining that the current user login is a high-risk login, the risk analysis subsystem 142 can cause performance of one or multiple mitigation operations. To that point, the risk analysis subsystem 142, via the access control module 240 (FIG. 2), for example, can cause a dashboard device 170 to present the risk score that may be included in the risk assessment of the current user login. The risk score can be presented at a time immediately after determining that the risk assessment indicates high-risk activity. The dashboard device 170 can be a form of client device, such as a server device, a personal computer (PC), a laptop computer, a tablet computer, or a smartphone. The dashboard device 170 can present the risk score within a user interface, where the user interface includes a visual element representative of the risk score. To that end, the dashboard device 170 can output the user interface to a display device that presents the user interface. In some cases, the user interface that is presented also can include other visual elements indicative of respective data that characterize the current user login corresponding to the risk score being presented. As mentioned, such data can include a username, a password, location data, a hostname, a logical address, a timestamp indicative of a time the user login was attempted. In addition, or in some cases, such data can include a login identifier, such as a universally unique identifier (UUID). The display device can be integrated into the dashboard device 170 or can be functionally coupled thereto.

As is illustrated in FIG. 1A, causing the dashboard device 170 to present a risk score can include sending, to the dashboard device 170, a directive to update a user interface 180 to include the risk score. The user interface 180 thus includes a visual element 184 indicative of the risk score and, in some cases, also may include one or more visual elements 182 indicative of a unique identifier of the user login corresponding to the risk score and/or other data representative of the user login (e.g., a timestamp). Updating the user interface 180 can include creating the user interface 180 or modifying an existing version of the user interface 180. The dashboard device 170 can update data and/or formatting information that define the user interface and upon completion of the update, the dashboard device 170 can present the updated user interface 180. The directive to update the user interface 180 can be sent via a network 160 (represented by an open arrow in FIG. 1A). The network 160 can include wired link(s) and/or wireless link(s) and several network elements (such as routers or switches, concentrators, servers, and the like) that form a communication architecture having a defined footprint. The network 160 may be embodied in a local area network (LAN), a metropolitan area network (MAN), a wide area network (WAN), or a combination thereof.

Accordingly, embodiments of this disclosure can maintain an essentially real-time view, via the user interface 180, for example, of user logins that pose a threat to the system of multiple platform devices 104. By providing rich information related to high-risk logins in essentially real-time, embodiments of this technology can permit efficiently assessing threats to the system of multiple platform devices 104.

In other cases, or in further response to determining that the current user login is a high-risk login, the risk analysis subsystem 142 can cause a blockade or denial of access to the data analytics platform to a user device and/or an electronic address corresponding to the current user login. Denying access to the data analytics platform can include blocking the user device and/or the electronic address from establishing a communication session with the system of platform devices 104. In one example, a hostname or an Internet protocol (IP) address corresponding to the current user login can be blocked from accessing the data analytics platform. Accordingly, the risk analysis subsystem 142, via the access control module 240 (FIG. 2), for example, can cause the platform portal device 130 to block or otherwise deny access to the data analytics platform to a hostname and/or an IP address corresponding to the current user login. In addition, or in some configurations, the risk analysis subsystem 142 can cause an extract, transform, load (ETL) device (not depicted in FIG. 1A) to update log data to indicate that current user login has been denied.

In addition, or in other cases, the risk analysis subsystem 142, via the access control module 240 (FIG. 2), for example, can cause the platform portal device 130 to direct a user device corresponding to the current login to present a challenge-response test. The user device can be one of the user device 1 110(1) to user device N 110(N), for example. Such a test and/or variation(s) thereof can be presented one time or multiple times. Data defining a response to the challenge-response test and/or other data defining responses to one or multiple variations of that test can be collected by the risk analysis subsystem 142. By collecting such responses for respective user logins that have been deemed high-risk logins, the risk analysis subsystem 142 can supply, to the risk evaluation service, data identifying the respective user logins as high-risk and other data characterizing such user logins, to implement reinforced machine-learning in order to improve risk assessments of user logins.

By performing mitigation operation as high-risk logins are identified, embodiments of this disclosure can preserve the integrity of the system of platform devices 104. Additionally, such mitigation can permit avoiding inefficient use of computing resources in such a system.

Regardless of whether a user login is a high-risk user login or a non-high-risk user login, the risk analysis subsystem 142 (via the collection module 210, for example) can retain data indicative of the user login and, in some cases, the risk assessment that has been determined for the user login. Such data can include, for example, a username, a password, location data, a hostname, a logical address, or a timestamp indicative of a time at which the user login was attempted. As user login attempts occur, the risk analysis subsystem 142 can retain, in the data storage 250, a time series of records indicative of respective user logins. Each record in the time series of records can include data indicative of a respective user login. In some cases, the time series of records can updated to include a new record indicative of a new user login as the assessment of the new user login is complete. In other cases, the time series of records can be updated to include a new record indicative of a new user login as login data indicative of the new user login becomes available (e.g., substantially as the new user login is attempted and a timestamp is assigned to that attempt).

Figure 1B:
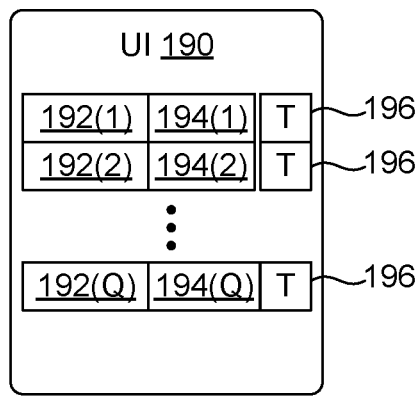
FIG. 1B illustrates an example of a user interface, in accordance with one or more embodiments of this disclosure.

The dashboard device 170 can access data retained in the data storage 250. The data can be accessed via the lookup module 220, for example, in response to execution of a client application (e.g., web application or a mobile application) within the dashboard device 170. By accessing data retained in the data storage 250, the dashboard device 170 can present one several views of login data, e.g., usernames, passwords, location data, hostnames, IP addresses, and/or timestamps. To that end, the dashboard device 170 can generate a query a query criterion dictating desired type of login data. For example, the query criterion can specify that login data corresponding to high-risk logins at a particular location during a particular time interval are desired. The dashboard device 170 can send that query to the risk analysis subsystem 142 via the network 160. The risk analysis subsystem (via the lookup module 220 (FIG. 2), for example) can perform a query operation against the data storage 250. The query operation includes resolving the received query by accessing the data storage 250 and retrieving login data based on the query criterion include in the query. The lookup module 220 can send login data that satisfy the query criterion in the query to the dashboard device 170. In response to receiving such login data, the dashboard device 170 can cause presentation of a user interface 190 (FIG. 1B) that includes a listing of user logins identified by the login data received by the dashboard device 170. Such listing can include, for example, rows of visual elements that convey login data for respective user logins and also include a selectable visual element 196. More specifically, each row can include one or more visual elements 192(k) indicative of data charactering a user login; a visual element 194(k) indicative of a risk score (or, in some cases a risk category) of the user login; and a selectable visual element 196. Here, k=1, 2, . . . or Q, where Q is natural number identifying the number of rows in the data view.

One or more of the selectable visual elements 196 can be selected for respective user logins. By selecting a selectable visual element 196, a user login corresponding to the selected element can be identified or otherwise configured, with certainty, as a high-risk user login. Such a selection causes the dashboard device 170 to send data indicative of the selected user logins to the risk analysis subsystem 142. The data can server as labeled training data. Thus, the risk analysis subsystem 142 can send that data to at least one of the risk evaluation service devices 150 to update the prediction model 154. An updated version of the prediction model 154 can be applied to other login data to identify high-risk logins. In other words, embodiments of this disclosure can permit determining labeled data to train a machine-learning prediction model to identify high-risk user logins. Because numerous data views of login data can be generated, embodiments of this disclosure provide a degree of flexibility in the generation of labeled data that is uncommon in existing technologies. As a result, detection and mitigation of high-risk activity can be performed more efficiently than in existing technologies. Thus, embodiments of this disclosure can use computing resources, e.g., processor time, memory resources, and/or network bandwidth.

Figure 3:
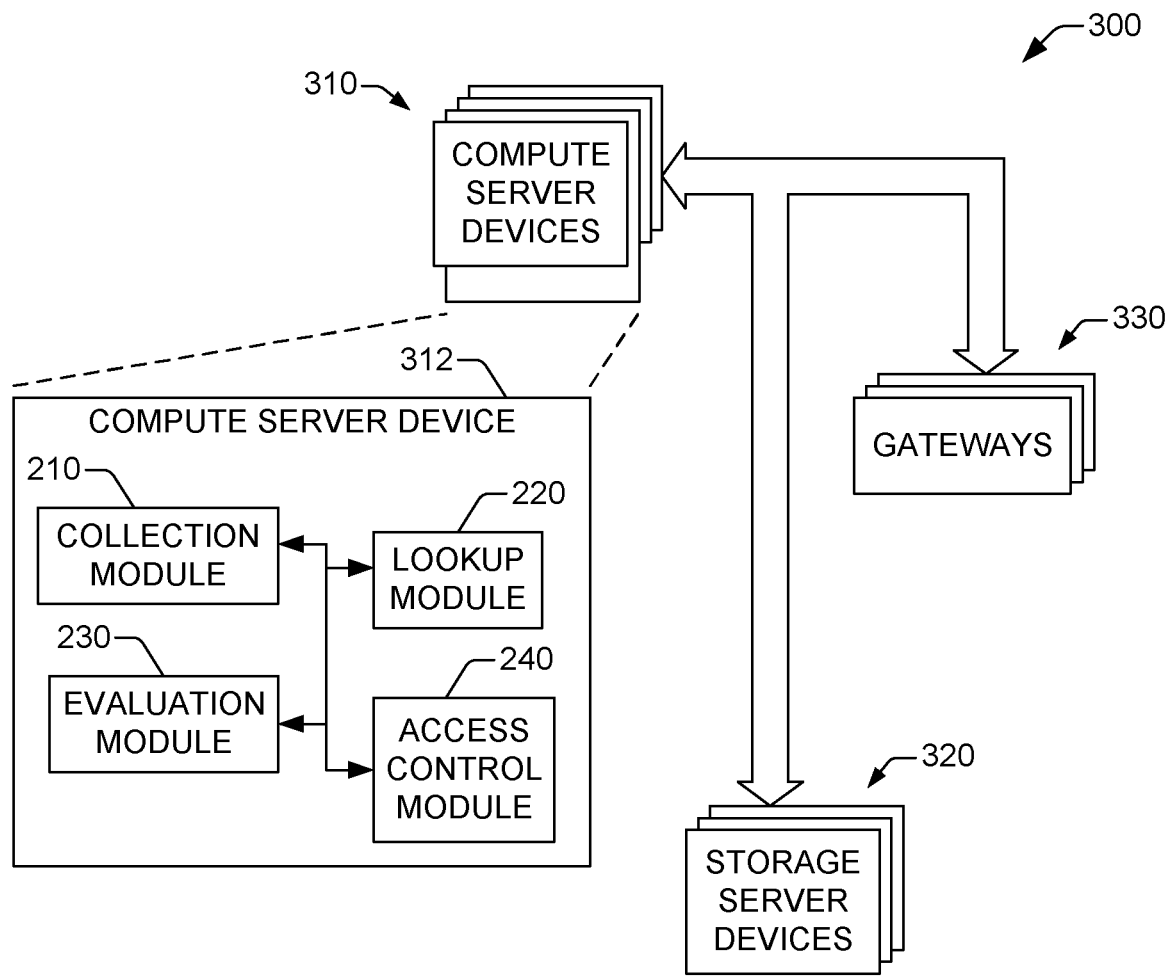
FIG. 3 illustrates an example of a computing system for detection and mitigation of high-risk online activity in computing platform, in accordance with one or more embodiments of this disclosure.

FIG. 3 is a schematic block diagram of an example of a computing system 300 that can embody, or can include, the risk detection system 140, in accordance with one or more embodiments of this disclosure. Accordingly, the example computing system 300 can provide the functionality described herein in connection with the risk detection system 140.

The example computing system 300 includes two types of server devices: Compute server devices 310 and storage server devices 320. A subset of the compute server devices 310, individually or collectively, can host the various modules that constitute the risk analysis subsystem 142. For the sake of illustration, a particular compute server device 312 within such a subset is schematically depicted as hosting such modules. Each one of the compute server devices in such a subset can include the structure shown for the compute server device 312, for example. Thus, such a subset of compute server device 310 can operate in accordance with functionality described herein in connection with detection and mitigation of high-risk online activity in computing platform. Further, at least one server device of the compute server devices 310 can host the in-memory storage 144 (see FIG. 2, for example). The at least one server device can be configured as part of a virtual private cloud (VPC). Therefore, a server device in the subset of the compute server devices 310 can access the in-memory storage 144 via an endpoint SSE connection (represented by a solid circle in FIG. 2).

At least the subset of the compute server devices 310 can be functionally coupled to one or many of the storage server devices 320. That coupling can be direct or can be mediated by at least one of gateway devices 330. The storage server devices 320 include data and metadata that can be used to implement the functionality described herein in connection with the detection and mitigation of high-risk online activity in computing platform. Some or all of the storage server devices 320 can embody, or can constitute, the data storage 250 (FIG. 2).

Each one of the gateway devices 330 can include one or many processors functionally coupled to one or many memory devices that can retain application programming interfaces (APIs) and/or other types of program code for access to the compute server devices 310 and storage server devices 320. Such access can be programmatic, via an appropriate function call, for example. The subset of the compute server devices 310 that host the risk analysis subsystem 142 also can use API(s) supplied by the gateway devices 330 in order access the VPC that hosts the in-memory storage 144.

Figure 4:
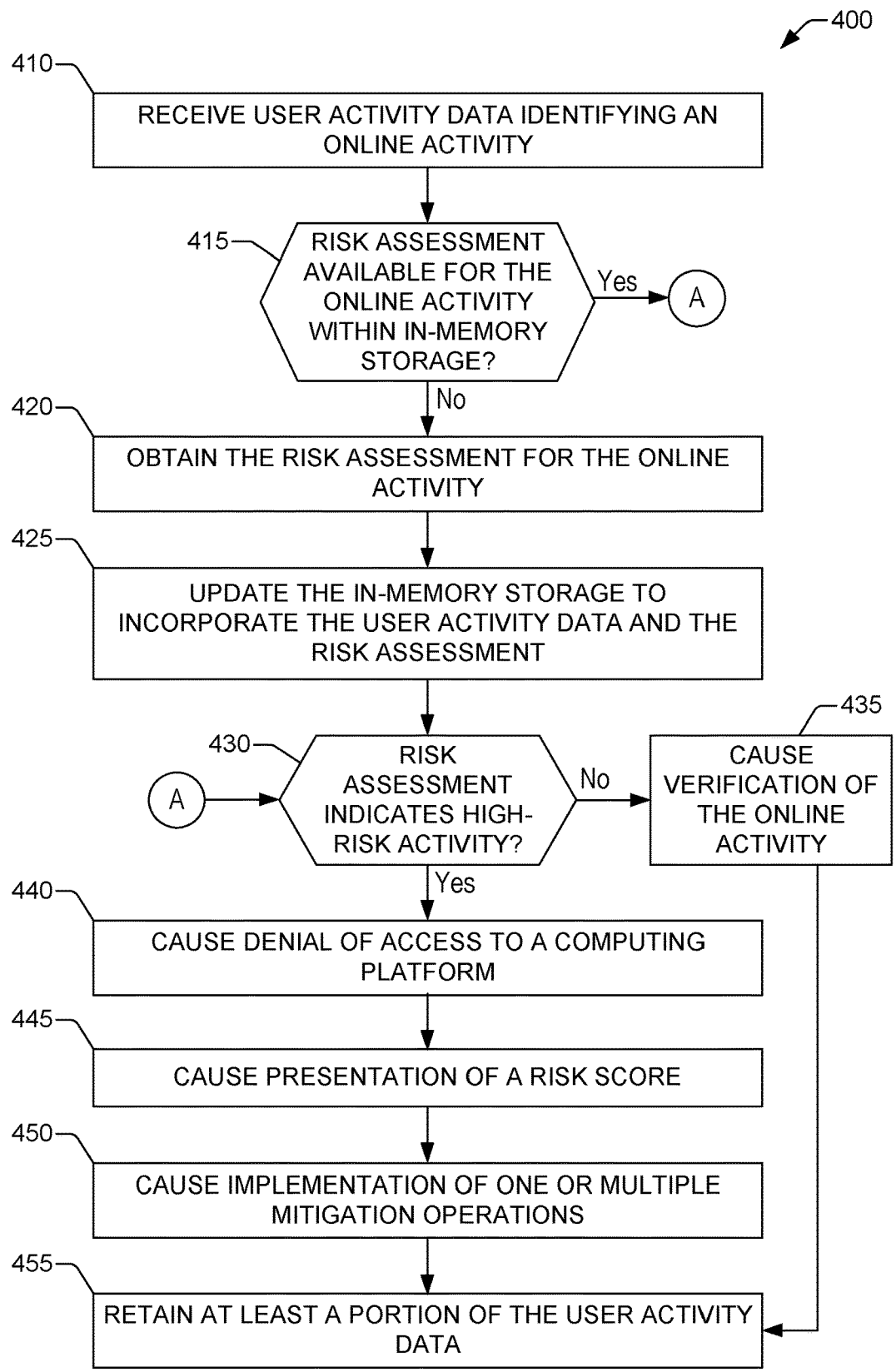
FIG. 4 illustrates an example of a method for detecting and mitigating high-risk online activity in a computing platform, in accordance with one or more embodiments of this disclosure.

FIG. 4 illustrates an example of a method 400 for detecting and mitigating high-risk online activity in a computing platform (such as a data analytics platform), in accordance with one or more embodiments of this disclosure. A computing device or a system of computing devices can implement the example method 400 in its entirety or in part. To that end, each computing device can include computing resources that can implement, or can permit implementing, at least one of the blocks included in the example method 400. The computing resources include, for example, central processing units (CPUs), graphics processing units (GPUs), tensor processing units (TPUs), memory, disk space, incoming bandwidth, and/or outgoing bandwidth, interface(s)

(such as I/O interfaces or APIs, or both); controller devices(s); power supplies; a combination of the foregoing; and/or similar resources. For instance, the system of computing devices can include programming interface(s); an operating system; software for configuration and or control of a virtualized environment; firmware; and similar resources.

The system of computing devices can embody, or can include, the risk analysis subsystem 142 (FIG. 1A). Thus, the system of computing devices can host, among other components, the collection module 210 (FIG. 2), the lookup module 220 (FIG. 2), the evaluation module 230 (FIG. 2), and the access control module 240 (FIG. 2). The system of computing devices can be functionally coupled to an in-memory storage (e.g., the in-memory storage 144 (FIG. 1A)). Accordingly, in some cases, the system of computing devices can implement the example method 400, entirely or partially, via the foregoing modules described herein.

At block 410, the system can receive user activity data identifying an online activity. An example of the online activity is a user login to a computing platform (a SaaS computing environment, for example). In cases wherein the online activity is a user login, the user activity data can include, for example, a username, a password, location data, a hostname, a logical address, or a timestamp indicative of a time at which the user login was attempted. The location data can be indicative of an area where the user login has been attempted.

At block 415, the system can determine if a risk assessment for the online activity is available within in-memory storage. To that end, the system can determine, using the user activity data, presence or absence of a record of the online activity from the in-memory storage. The in-memory storage (e.g., in-memory storage 144 (FIG. 1A)) can retain records of historical online activities and respective risk assessments. Each one of such records can include first data identifying a particular online activity (e.g., a particular user login) and second data defining a particular risk assessment. As mentioned, the risk assessment can include a risk score or a risk category, or both, for example. The in-memory storage can be embodied in an in-memory key-value cache having low latency (of the order of 1 ms or less, for example). Latencies of the order of 10 ms also may be satisfactory. As such, each one of the records retained in the in-memory cache can be formatted as a key-value pair, where a particular key is formed by data indicative of a particular online activity and a particular value is defined by data indicative of a corresponding risk assessment.

Thus, to determine presence or absence of a record of the online activity identified by the user activity data, the risk analysis subsystem (via the lookup module 220 (FIG. 2), for example) can perform a query operation against the in-memory storage. The query operation can include generating a query including a query criterion dictating that the desired online activity is the online activity identified by the user activity data. The query operation also can include resolving the query by accessing the in-memory storage. A null result of the query operation indicates that the record of the online activity is absent from the in-memory cache. Hence, the risk assessment for that online activity may be deemed unavailable.

In response to a negative determination at block 415 ("No" branch), the system can obtain the risk assessment for the online activity at block 420. To that end, the system can cause a machine-learning service to generate, using a prediction model, the risk assessment. The machine-learning service can be hosted or otherwise provided by a second system of computing devices. The prediction model determines risk scores for respective online activities. As mentioned, a first risk score of the risk scores defines a probability of a first online activity of the respective online activities pertaining to a first risk category. In one example, the second system can include the devices 150 (FIG. 1A), and the prediction model can be the prediction model 154 (FIG. 1A). More specifically, the system can direct the machine-learning service to generate a risk score or a risk category, or both, by applying the prediction model to user activity data defining the online activity. Directing the machine-learning service to generate the risk score or risk category, or both, in such a fashion can include sending, to the second system, a message invoking a function call of the machine-learning service. The message can include the user activity data as payload data, which data serve as an argument of the function call. Additionally, the system can receive, from the machine-learning service, the generated risk score and/or data identifying the generated risk category.

At block 425, the system can update the in-memory storage (e.g., in-memory storage 144 (FIG. 1A)) that retains the records of historical online activities and respective risk assessments. The in-memory storage can be updated to incorporate the user activity data and the risk assessment. Incorporating the user activity data and the risk assessment (e.g., risk score and/or risk category) into the in-memory storage can include adding a key-value pair to the in-memory storage, for example.

At block 430, the system can determine if the risk assessment is indicative of the online activity being a high-risk activity. To that end, in some cases, the system can apply one or multiple rules to the risk assessment. The rule(s), individually or in combination, can define a condition that the risk assessment must satisfy in order to be deemed indicative of a high-risk user login.

In response to a negative determination at block 430 ("No" branch), the system can cause verification of the online activity at block 435. Such a verification can result in one or multiple other operations (not depicted in FIG. 4) consistent with the online activity. For example, in case the online activity is a user login to a computing platform, a user account associated with the user login may be granted access to that computing platform and one or multiple services provided by the computing platform. The flow of the example method 400 can continue to block 455.

In the alternative, in response to determining that the risk assessment indicates high-risk activity ("Yes" branch at block 430), the flow of the example method 400 can continue to block 440. At that block, the system can cause denial of access to the computing platform. The computing platform can be embodied in, for example, the data analytics platform provided by the system of platform devices 104 (FIG. 1). Such denial of access can be caused at a time immediately after determining that the risk assessment indicates high-risk activity.

At block 445, the system can cause presentation of the risk score that may be included in the risk assessment. The risk score can be presented at a time immediately after determining that the risk assessment indicates high-risk activity. For example, the system can cause another computing device to present the risk score. That other computing device can be the dashboard device 170 (FIG. 1A), for example, or another type of client device.

In further response to determining that the risk assessment indicates high-risk activity, at block 450, the system can cause implementation of one or multiple mitigation operations. In some cases, the implementation of the mitigation operation(s) can be caused at a time immediately after determining that the risk assessment indicates high-risk activity or causing denial of access at block 440. An example of a mitigation operation includes blocking the online activity (e.g., blocking a user login). Another example of a mitigation operation comprises causing a user device associated with the online activity to present a challenge-response test and/or blocking an Internet protocol (IP) address associated with the user device.

At block 455, the system can retain at least a portion of the user activity data and, in some cases, the risk assessment for the online activity. The data can be retained in one or more storage server devices (e.g., at least one of storage server devices 320 (FIG. 3)). The storage server device(s) can be functionally coupled to the system of computing devices that implement the example method 400. In cases where the online activity is a user login to a computing platform (such as a SaaS data analytics platform), the data that is retained can include, for example, a username, a password, location data, a hostname, a logical address, or a timestamp indicative of a time at which the user login was attempted.

Figure 5:
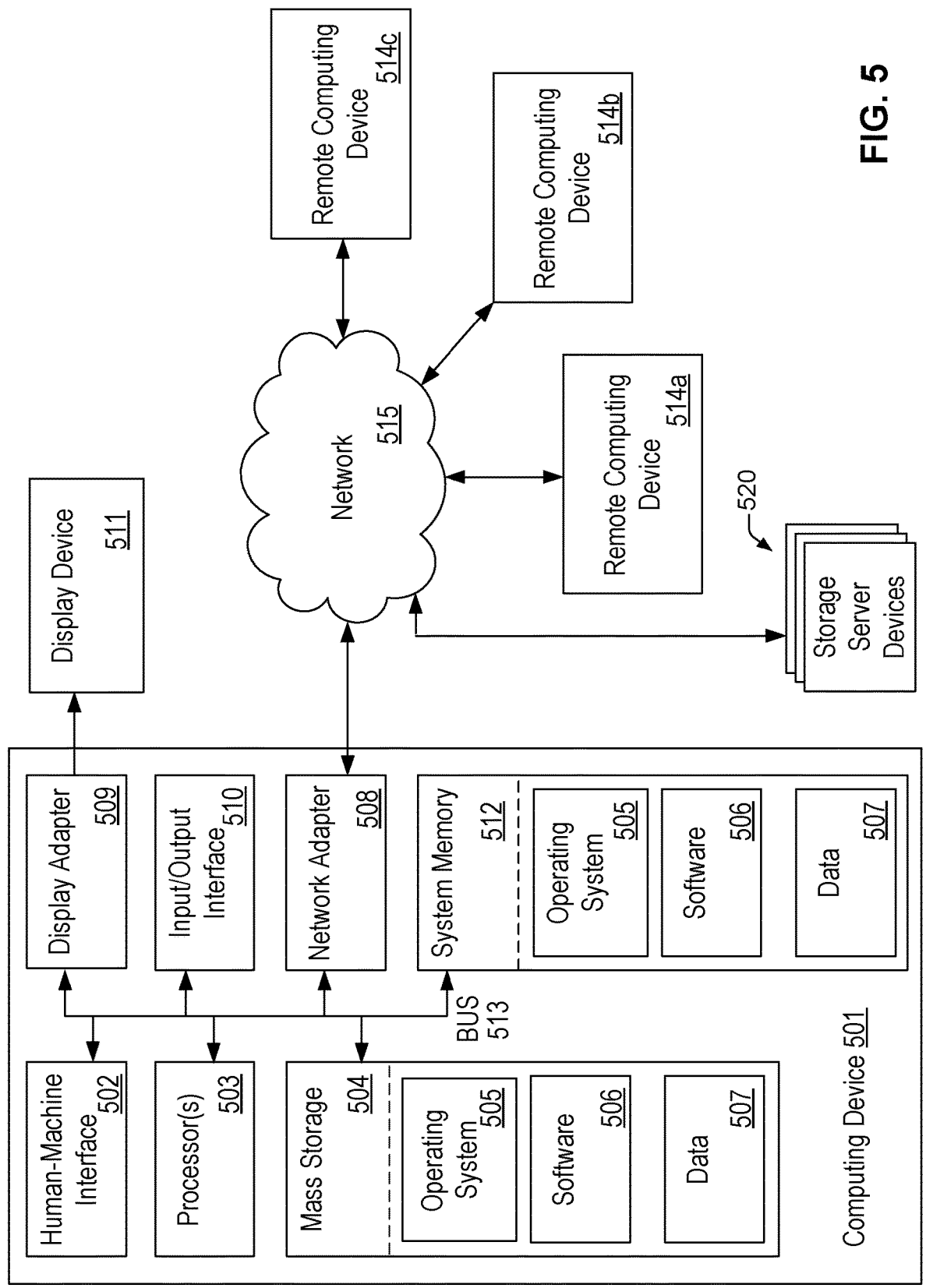
FIG. 5 illustrates an example of a computing system that can implement detection and mitigation of high-risk online activity in a computing platform, in accordance with one or more embodiments of this disclosure.

In order to provide some context, the computer-implemented methods and systems of this disclosure can be implemented on the computing system illustrated in FIG. 5 and described below. Similarly, the computer-implemented methods and systems disclosed herein can utilize one or more computing devices to perform one or more functions in one or more locations. FIG. 5 is a block diagram illustrating an example of a computing system 500 for performing the disclosed methods and/or implementing the disclosed systems. The computing system 500 shown in FIG. 5 is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The computer-implemented methods and systems in accordance with this disclosure can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set-top boxes, programmable consumer electronics, network PCs, minicomputers, mainframe computers, distributed computing environments that comprise any of the above systems or devices, and the like.

The processing of the disclosed computer-implemented methods and systems can be performed by software components. The disclosed systems and computer-implemented methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed computer-implemented methods can also be practiced in grid-based and distributed computing environments where tasks are performed by remote processing devices that are linked through a communications network. In a distributed computing environment, program modules can be located in both local and remote computer storage media including memory storage devices.

Further, the systems and computer-implemented methods disclosed herein can be implemented via a general-purpose computing device in the form of a computing device 501. The components of the computing device 501 can comprise, but are not limited to, one or more processors 503, a system memory 512, and a system bus 513 that functionally couples various system components including the one or more processors 503 to the system memory 512. The system can utilize parallel computing.

The system bus 513 represents one or more of several possible types of bus structures, including a memory bus or memory controller, a peripheral bus, an accelerated graphics port, or local bus using any of a variety of bus architectures. The bus 513, and all buses specified in this description can also be implemented over a wired or wireless network connection and each of the subsystems, including the one or more processors 503, one or more mass storage devices 504 (referred to as mass storage 504), an operating system 505, software 506, data 507, a network adapter 508, the system memory 512, an Input/Output Interface 510, a display adapter 509, a display device 511, and a human-machine interface 502, can be contained within one or more remote computing devices 514a,b,c at physically separate locations, connected through buses of this form, in effect implementing a fully distributed system.

The computing device 501 typically comprises a variety of computer-readable media. Exemplary readable media can be any available media that is accessible by the computing device 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as the data 507 and/or program modules such as the operating system 505 and the software 506 that are immediately accessible to and/or are presently operated on by the one or more processors 503.

The computing device 501 can also comprise other removable/non-removable, volatile/non-volatile computer storage media. As an example, FIG. 5 illustrates the mass storage 504 which can provide non-volatile storage of computer code, computer readable instructions, data structures, program modules, and other data for the computing device 501. For example and not meant to be limiting, the mass storage 504 can be embodied in, or can include, a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage 504, including by way of example, the operating system 505 and the software 506. Each of the operating system 505 and the software 506 (or some combination thereof) can comprise elements of the programming and the software 506. The data 507 can also be stored on the mass storage 504. The data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. The software 506 can include, in some cases, the collection module 210, the lookup module 220, the evaluation module 230, and the access control module 240. Execution of the software 506 by the processor(s) 503 can cause the computing device 501 to provide at least some of the functionality described herein connection with detection and mitigation of high-risk online activity (e.g., user logins) in real-time as is described herein.

In another aspect, the user can enter commands and information (e.g., a username and password) into the computing device 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the one or more processors 503 via the human-machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, the display device 511 can also be connected to the system bus 513 via an interface, such as the display adapter 509. It is contemplated that the computing device 501 can have more than one display adapter 509 and the computing device 501 can have more than one display device 511. For example, the display device 511 can be a monitor, an LCD (Liquid Crystal Display), or a projector. In addition to the display device 511, other output peripheral devices can comprise components such as speakers (not shown) and a printer (not shown) which can be connected to the computing device 501 via the Input/Output Interface 510. Any operation and/or result of the methods can be output in any form to an output device. Such output can be any form of visual representation, including, but not limited to, textual, graphical, animation, audio, tactile, and the like. The display device 511 and computing device 501 can be part of one device, or separate devices.

The computing device 501 can operate in a networked environment using logical connections to one or multiple remote computing devices 514a,b,c and/or one or multiple storage server devices 520. For example, a remote computing device can be a personal computer, portable computer, smartphone, a server, a router, a network computer, a peer device or other common network node, and so on. The one or multiple storage server devices 520 can embody, or can constitute, the storage server devices 320. Logical connections between the computing device 501 and a remote computing device 514a,b,c and a server storage device of the server storage device(s) 520 can be made via a network 515, such as a local area network (LAN) and/or a general wide area network (WAN). Such network connections can be through the network adapter 508. The network adapter 508 can be implemented in both wired and wireless environments. In an aspect, one or more of the remote computing devices 514a,b,c can comprise an external engine and/or an interface to the external engine.

In some cases, the structure of the each one of the remote computing devices 514a,b,c can be the same as that of the computing device 501. As such, each one of the remote computing devices 514a,b,c also can include the processor(s) 503, the mass storage 504, the system memory 512, and software 506 and other components described herein. That software can include in some cases, the collection module 210, the lookup module 220, the evaluation module 230, and the access control module 240. In such cases, the computing device 501 and the remote computing devices 514a,b,c can constitute a portion of the compute server devices 310 (FIG. 3). Execution of the software 506, in parallel, for example, by the processor(s) 503 in each on such computing devices can cause the computing device 501 and the remote computing devices 514a,b,c, individually or collectively, to provide at least some of the functionality described herein connection with detection and mitigation of high-risk online activity (e.g., user logins) in real-time.

For purposes of illustration, application programs and other executable program components such as the operating system 505 are illustrated herein as discrete blocks, although it is recognized that such programs and components reside at various times in different storage components of the computing device 501, and are executed by the one or more processors 503 of the computer. An implementation of the software 506 can be stored on or transmitted across some form of computer-readable media. Any of the disclosed methods can be performed by computer readable instructions embodied on computer-readable media. Computer-readable media can be any available media that can be accessed by a computer. By way of example and not meant to be limiting, computer-readable media can comprise "computer storage media" and "communications media." "Computer storage media" comprise volatile and non-volatile, removable and non-removable media implemented in any methods or technology for storage of information such as computer-readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

It is to be understood that the computer-implemented methods and systems described here are not limited to specific operations, processes, components, or structure described, or to the order or particular combination of such operations or components as described. It is also to be understood that the terminology used herein is for the purpose of describing exemplary embodiments only and is not intended to be restrictive or limiting.

As used herein the singular forms "a," "an," and "the" include both singular and plural referents unless the context clearly dictates otherwise. Values expressed as approximations, by use of antecedents such as "about" or "approximately," shall include reasonable variations from the referenced values. If such approximate values are included with ranges, not only are the endpoints considered approximations, the magnitude of the range shall also be considered an approximation. Lists are to be considered exemplary and not restricted or limited to the elements comprising the list or to the order in which the elements have been listed unless the context clearly dictates otherwise.

Throughout the specification and claims of this disclosure, the following words have the meaning that is set forth: "comprise" and variations of the word, such as "comprising" and "comprises," mean including but not limited to, and are not intended to exclude, for example, other additives, components, integers, or operations. "Include" and variations of the word, such as "including" are not intended to mean something that is restricted or limited to what is indicated as being included, or to exclude what is not indicated. "May" means something that is permissive but not restrictive or limiting. "Optional" or "optionally" means something that may or may not be included without changing the result or what is being described. "Prefer" and variations of the word such as "preferred" or "preferably" mean something that is exemplary and more ideal, but not required. "Such as" means something that serves simply as an example.

Operations and components described herein as being used to perform the disclosed methods and construct the disclosed systems are illustrative unless the context clearly dictates otherwise. It is to be understood that when combinations, subsets, interactions, groups, etc. of these operations and components are disclosed, that while specific reference of each various individual and collective combinations and permutation of these may not be explicitly disclosed, each is specifically contemplated and described herein, for all methods and systems. This applies to all aspects of this application including, but not limited to, operations in disclosed methods and/or the components disclosed in the systems. Thus, if there are a variety of additional operations that can be performed or components that can be added, it is understood that each of these additional operations can be performed and components added with any specific embodiment or combination of embodiments of the disclosed systems and methods.

Embodiments of this disclosure may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices, whether internal, networked, or cloud-based.

Embodiments of this disclosure have been described with reference to diagrams, flowcharts, and other illustrations of computer-implemented methods, systems, apparatuses, and computer program products. Each block of the block diagrams and flowchart illustrations, and combinations of blocks in the block diagrams and flowchart illustrations, respectively, can be implemented by processor-accessible instructions. Such instructions can include, for example, computer program instructions (e.g., processor-readable and/or processor-executable instructions). The processor-accessible instructions can be built (e.g., linked and compiled) and retained in processor-executable form in one or multiple memory devices or one or many other processor-accessible non-transitory storage media. These computer program instructions (built or otherwise) may be loaded onto a general-purpose computer, special purpose computer, or other programmable data processing apparatus to produce a machine. The loaded computer program instructions can be accessed and executed by one or multiple processors or other types of processing circuitry. In response to execution, the loaded computer program instructions provide the functionality described in connection with flowchart blocks (individually or in a particular combination) or blocks in block diagrams (individually or in a particular combination). Thus, such instructions which execute on the computer or other programmable data processing apparatus create a means for implementing the functions specified in the flowchart blocks (individually or in a particular combination) or blocks in block diagrams (individually or in a particular combination).

These computer program instructions may also be stored in a computer-readable memory that can direct a computer or other programmable data processing apparatus to function in a particular manner, such that the instructions stored in the computer-readable memory produce an article of manufacture including processor-accessible instruction (e.g., processor-readable instructions and/or processor-executable instructions) to implement the function specified in the flowchart blocks (individually or in a particular combination) or blocks in block diagrams (individually or in a particular combination). The computer program instructions (built or otherwise) may also be loaded onto a computer or other programmable data processing apparatus to cause a series of operations to be performed on the computer or other programmable apparatus to produce a computer-implemented process. The series of operations can be performed in response to execution by one or more processor or other types of processing circuitry. Thus, such instructions that execute on the computer or other programmable apparatus provide operations for implementing the functions specified in the flowchart blocks (individually or in a particular combination) or blocks in block diagrams (individually or in a particular combination).

Accordingly, blocks of the block diagrams and flowchart illustrations support combinations of means for performing the specified functions in connection with such diagrams and/or flowchart illustrations, combinations of operations for performing the specified functions and program instruction means for performing the specified functions. Each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

The methods and systems can employ artificial intelligence techniques such as machine learning and iterative learning. Examples of such techniques include, but are not limited to, expert systems, case-based reasoning, Bayesian networks, behavior-based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the computer-implemented methods, apparatuses, devices, and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is in no way intended that an order be inferred, in any respect. This holds for any possible non-express basis for interpretation, including: matters of logic with respect to arrangement of operations or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A computer-implemented method comprising:
receiving, by a computing device, data comprising at least one user account element and an indication of a login attempt at a computing platform, wherein the login attempt is associated with a user device;
determining, based on the indication of the login attempt, that a risk assessment associated with the login attempt is unavailable from an in-memory storage, wherein the in-memory storage comprises key-value pairs, each key being a user account element, and each value being a corresponding risk assessment based on that key;
receiving, via a prediction model, the risk assessment for the login attempt, wherein the prediction model generates the risk assessment, comprising a risk score and a risk category, based on the data comprising the at least one user account element, wherein the at least one user account element and the risk assessment are stored in the in-memory storage as a new key-value pair;
determining, based on the risk assessment, that the risk score and the risk category are indicative of the login attempt being high-risk activity; and
causing, based on the login attempt being high-risk activity, the user device to be denied access to the computing platform.

2. The computer-implemented method of claim 1, wherein the at least one user account element comprises a username, a password, location data, a hostname, a logical address, or a timestamp.

3. The computer-implemented method of claim 1, further comprising causing implementation of one or more mitigation operations comprising at least one of causing the user device to present a challenge-response test or blocking an Internet protocol (IP) address associated with the user device.

4. The computer-implemented method of claim 1, wherein receiving the risk assessment comprises directing a service associated with the computing platform to generate the risk score and the risk category by applying the prediction model to the data comprising the at least one user account element.

5. The computer-implemented method of claim 4, wherein directing the service associated with the computing platform comprises sending a message invoking a function call of the service, wherein the message comprises the data comprising the at least one user account element as an argument of the function call.

6. The computer-implemented method of claim 1, wherein determining that the risk assessment associated with the login attempt is unavailable comprises performing a query operation against the in-memory storage, the query operation comprising a query criterion identifying the at least one user account element.

7. The computer-implemented method of claim 1, wherein determining that the risk score and the risk category are indicative of the login attempt being high-risk activity comprises:
applying one or more rules to the risk assessment, wherein at least one rule of the one or more rules defines a condition for high-risk activity; and
determining that the risk assessment satisfies the condition.

8. The computer-implemented method of claim 1, wherein the in-memory storage comprises a low-latency in-memory cache that retains records of historical login attempts and respective risk assessments.

9. An apparatus comprising:
at least one processor; and
memory comprising processor-executable instructions stored thereon that, in response to execution by the at least one processor, cause the apparatus to:
receive data comprising at least one user account element and an indication of a login attempt at a computing platform, wherein the login attempt is associated with a user device;
determine, based on the indication of the login attempt, that a risk assessment associated with the login attempt is unavailable from an in-memory storage, wherein the in-memory storage comprises key-value pairs, each key being a user account element, and each value being a corresponding risk assessment based on that key;
receive, via a prediction model, the risk assessment for the login attempt, wherein the prediction model generates the risk assessment, comprising a risk score and a risk category, based on the data comprising the at least one user account element, wherein the at least one user account element and the risk assessment are stored in the in-memory storage as a new key-value pair;
determine, based on the risk assessment, that the risk score and the risk category are indicative of the login attempt being high-risk activity; and
cause, based on the login attempt being high-risk activity, the user device to be denied access to the computing platform.

10. The apparatus of claim 9, wherein the at least one user account element comprises a username, a password, location data, a hostname, a logical address, or a timestamp.

11. The apparatus of claim 9, wherein the processor-executable instructions further cause the apparatus to cause implementation of one or more mitigation operations comprising at least one of causing the user device to present a challenge-response test or blocking an Internet protocol (IP) address associated with the user device.

12. The apparatus of claim 9, wherein the processor-executable instructions that cause the apparatus to receive the risk assessment further cause the apparatus to direct a service associated with the computing platform to generate the risk score and the risk category by applying the prediction model to the data comprising the at least one user account element.

13. The apparatus of claim 12, wherein the processor-executable instructions that cause the apparatus to direct the service associated with the computing platform further cause the apparatus to send a message invoking a function call of the service, wherein the message comprises the data comprising the at least one user account element as an argument of the function call.

14. The apparatus of claim 9, wherein the processor-executable instructions that cause the apparatus to determine that the risk assessment associated with the login attempt is unavailable from the in-memory storage further cause the apparatus to perform a query operation against the in-memory storage, the query operation comprising a query criterion identifying the at least one user account element.

15. The apparatus of claim 9, wherein the in-memory storage comprises a low-latency in-memory cache that retains records of historical login attempts and respective risk assessments.

16. At least one computer-readable non-transitory storage medium comprising processor-executable instructions stored thereon that, in response to execution by at least one computing device, cause the at least one computing device to:

receive data comprising at least one user account element and an indication of a login attempt at a computing platform, wherein the login attempt is associated with a user device;

determine, based on the indication of the login attempt, that a risk assessment associated with the login attempt is unavailable from an in-memory storage, wherein the in-memory storage comprises key-value pairs, each key being a user account element, and each value being a corresponding risk assessment based on that key;

receive, via a prediction model, the risk assessment for the login attempt, wherein the prediction model generates the risk assessment, comprising a risk score and a risk category, based on the data comprising the at least one user account element, wherein the at least one user account element and the risk assessment are stored in the in-memory storage as a new key-value pair;

determine, based on the risk assessment, that the risk score and the risk category are indicative of the login attempt being high-risk activity; and cause, based on the login attempt being high-risk activity, the user device to be denied access to the computing platform.

17. The at least one computer-readable non-transitory storage medium of claim 16, wherein the at least one user account element comprises a username, a password, location data, a hostname, a logical address, or a timestamp.

18. The at least one computer-readable non-transitory storage medium of claim 16, wherein the processor-executable instructions further cause the at least one computing system device to cause implementation of one or more mitigation operations comprising at least one of causing the user device to present a challenge-response test or blocking an Internet protocol (IP) address associated with the user device.

19. The at least one computer-readable non-transitory storage medium of claim 16, wherein the processor-executable instructions that cause the at least one computing device to receive the risk assessment further cause the at least one computing device to direct a service associated with the computing platform to generate the risk score and the risk category by applying the prediction model to the data comprising the at least one user account element.

20. The at least one computer-readable non-transitory storage medium of claim 19, wherein the processor-executable instructions that cause the at least one computing device to direct the service associated with the computing platform further cause the computing device to send a message invoking a function call of the service, wherein the message comprises the data comprising the at least one user account element as an argument of the function call.

\* \* \* \* \*